Figure 5:
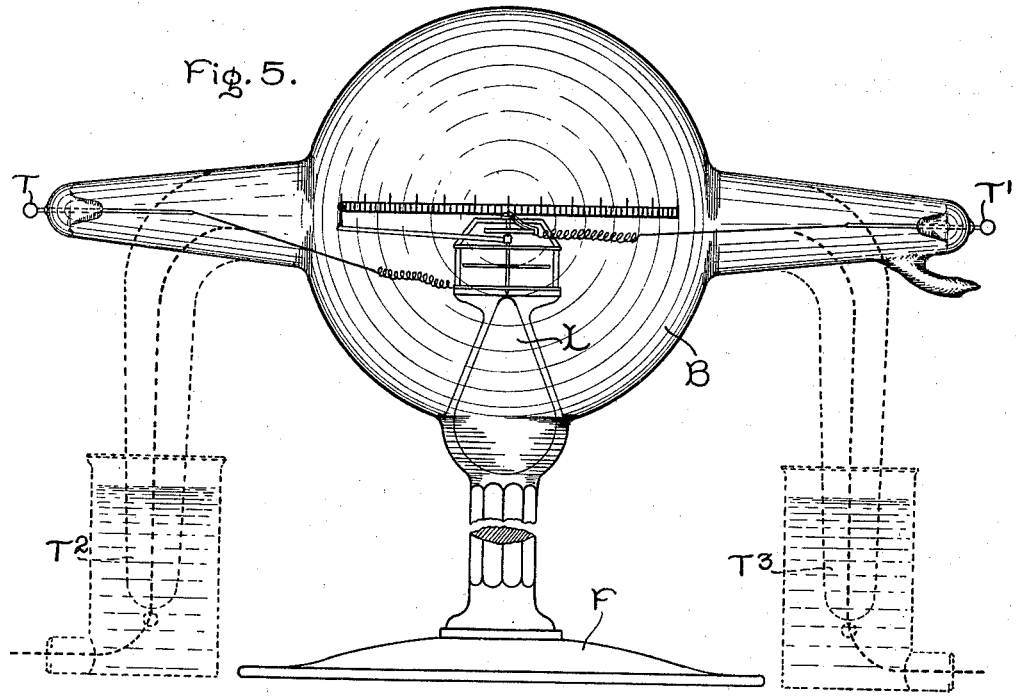

No. 627,155.  
E. THOMSON.  
ELECTROSTATIC MEASURING INSTRUMENT.  
(Application filed Apr. 18, 1898.)
(No Model.) 2 Sheets—Sheet 1.
Patented June 20, 1899.
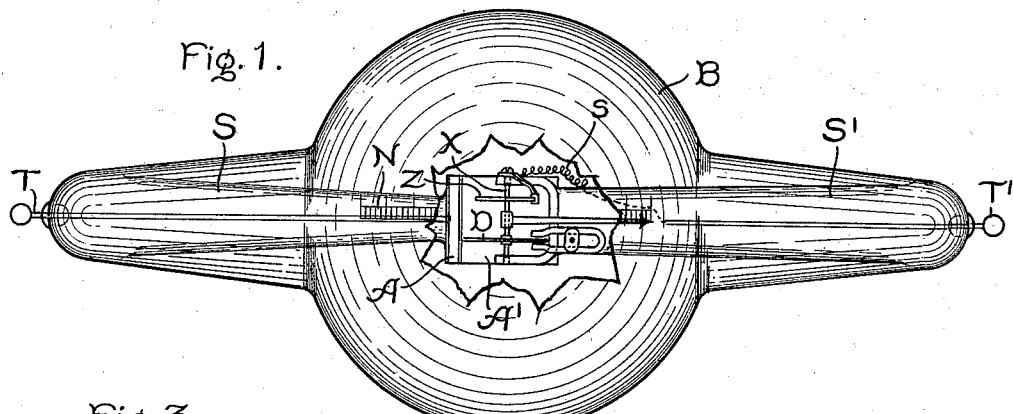
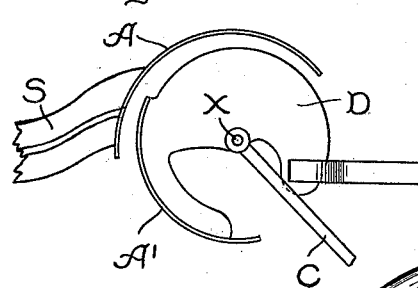
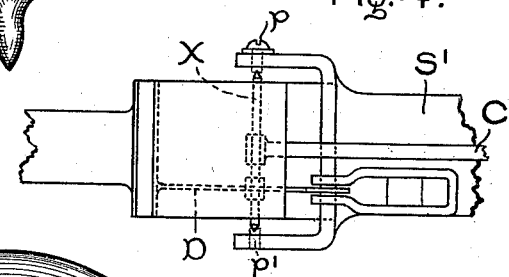
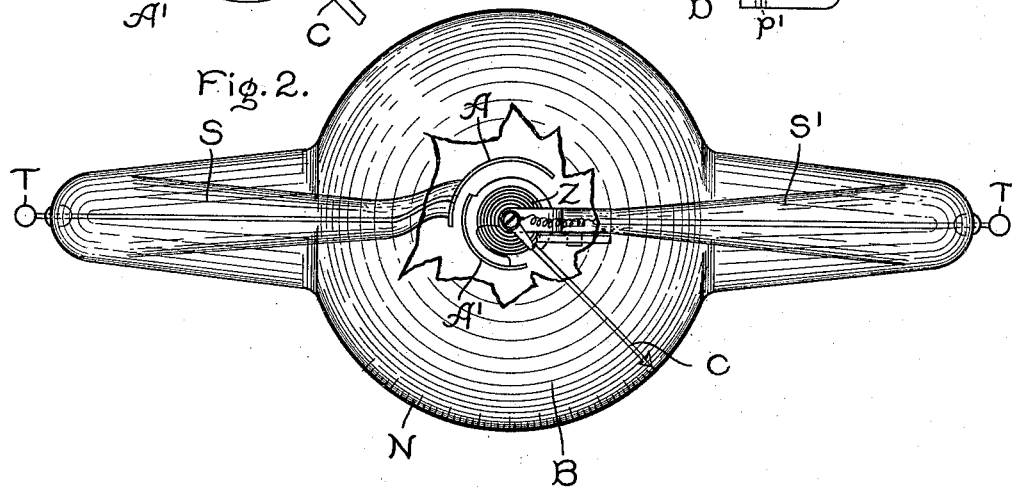
WITNESSES.  
Henry O. Westendarp  
B. B. Hill.
INVENTOR.  
Elihu Thomson,  
by Albert G. Davis  
Atty.

No. 627,155. Patented June 20, 1899.
E. THOMSON.
ELECTROSTATIC MEASURING INSTRUMENT.
(Application filed Apr. 18, 1898.)

(No Model.) 2 Sheets—Sheet 2.

WITNESSES.
Henry Westendarf
B. B. Hull

INVENTOR.
Elihu Thomson
by Albert G. Davis
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTROSTATIC MEASURING INSTRUMENT.

SPECIFICATION forming part of Letters Patent No. 627,155, dated June 20, 1899.

Application filed April 18, 1898. Serial No. 677,909. (No model.)

*To all whom it may concern:*

Be it known that I, ELIHU THOMSON, a citizen of the United States, residing at Swampscott, county of Essex, State of Massachusetts, have invented certain new and useful Improvements in Electrostatic Measuring Instruments, (Case No. 703,) of which the following is a specification.

My invention relates to electrical measuring instruments, and has particular reference to instruments designed to make electric measurements at very high potentials. In modern electric installations for the transmission of power to long distances potentials in excess of ten thousand volts are commercially used. The measurement of such potentials is at present a question of calculation, as no efficient measuring instrument has been devised which can be depended upon at anything like the potentials indicated. At such pressure the consequences of a short circuit are so serious that every precaution must be taken to prevent it. At the same time it is highly desirable that some means be provided for the direct measurement of the electrical conditions on such lines, and my invention, though not in any wise restricted thereto, is particularly useful in such installations.

The best instruments for the purposes of my invention are those of the electrostatic type, wherein there is no complete electric circuit. It is well known that these instruments are adapted to measurements of moderate or even quite high potential, because they act by induction, and the vanes and the quadrants which affect the vanes electrically are separated by an air-space, or they may even be separated by solid dielectric, although this is not the preferred construction.

The improvement in the construction of such devices and in the method of measuring potential with them which I have devised consists in connecting the two sides of the line or the two points whose difference of potential is to be measured by an instrument of the class described and inclosing the instrument in a non-striking vacuum. To do this, I take any preferred electrostatic voltmeter, the particular type of which may be varied indefinitely, and place it within a chamber, in which I produce such a vacuum that electrical discharges are prevented from passing between the opposing surfaces of the electrostatic voltmeter. It is evident that the chamber may well be constructed of glass. It is well known that in a Crookes vacuum a considerable difference of potential is required to pass the discharge—much higher than is required to pass the discharge in a Geissler tube, for instance. In instruments designed to measure moderate potentials these degrees of exhaustion would be sufficient; but if it is designed to measure the highest potentials which would ever be commercially employed I prefer to use the best obtainable vacuum, one which cannot be traversed by an electric discharge except at a pressure so far beyond the working potential of the instrument as to render the latter safe.

It will be understood that the form and disposition of parts may be greatly varied without departing from my invention and, further, that various arrangements of the moving parts with reference to the stationary parts and for taking the current into the vacuum-tube may also be employed.

Not only is it possible by the practice of the invention to render the instrument safe from discharge in the way pointed out, but inasmuch as I am enabled to bring the charged surfaces very much nearer together than if the instrument were to be used in air the attractive or repulsive forces are greatly increased and the instrument rendered very sensitive and reliable.

The drawings show embodiments of my invention and modifications thereof.

Figure 6:
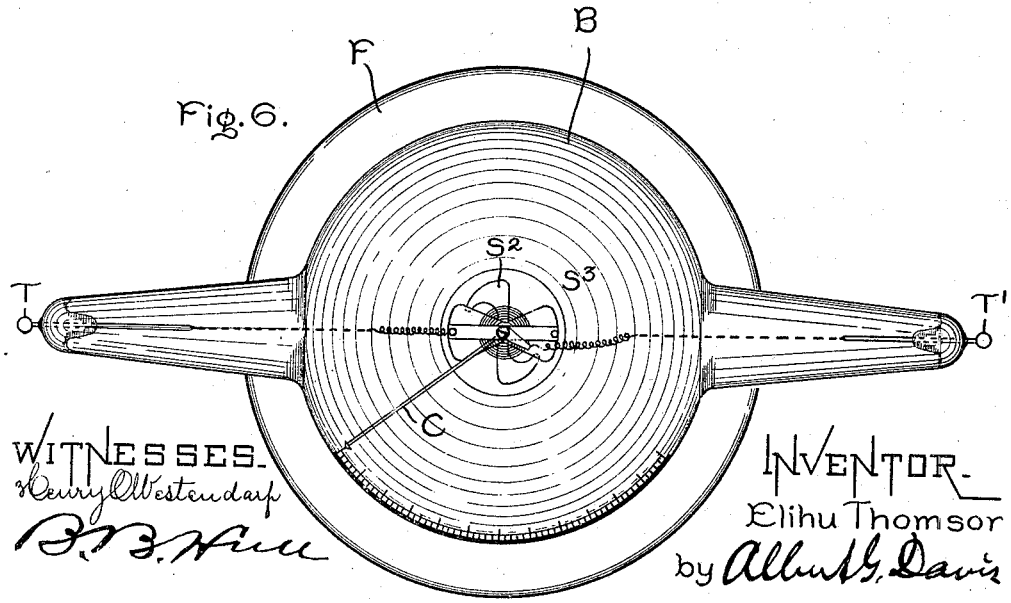

Figure 1 is a side elevation of an instrument embodying the invention. Fig. 2 is a plan. In both of these figures the glass is shown broken away. Figs. 3 and 4 are respectively a plan and a side elevation of parts of the instrument. Fig. 5 is a side elevation of a modified form, and Fig. 6 is a plan of the parts shown in Fig. 5.

In Fig. 1, B is the bulb within which the apparatus is inclosed. Within the bulb are two stems or glass supports S S'. Upon each of these is mounted an element of a suitable electrostatic instrument, such as a voltmeter.

Terminal wires T T' are sealed into the glass, and by these terminals connection is made to the two poles of a source of electricity the difference of potential of which is to be measured. These terminals are arranged at such a distance apart that there is no practical possibility of a spark occurring outside the bulb. It is to be understood in accordance with the statement of invention that the vacuum within the chamber is so high that no spark can pass from one surface to the other of the voltmeter. The glass stem S, through which the terminal T is connected, carries a stationary "quadrant" or curved piece A, of aluminium, which is in shape the segment of a cylinder, and to this the terminal is connected. Carried by the stem S' and connected in any suitable way to the terminal T' is a corresponding vane or segment A', also of aluminium or other conducting metal. In the case illustrated the connection is made to the terminal T' by a wire $s$, which connects the terminal wire to the shaft X. This shaft, as seen in Figs. 3 and 4, is mounted in suitable bearings carried upon the stem S', and upon the shaft is a disk D, of aluminium or other good conducting metal, which carries the segment A' and which also swings between the poles of a magnet, acting as a damper, in a way now well understood in the art. To the shaft is also affixed the hand or pointer C of the instrument, which plays over a scale N, (see Fig. 2,) which is here shown as etched upon the glass of the bulb. The magnet is supported in any desired manner from the stem S'. A spring Z is provided for returning the instrument to zero, and its tension is adjusted to any required delicacy of movement of the instrument. Pivots or bearings $p$ $p'$ are also provided, in which the shaft X is mounted.

The action of the parts as so far described is as follows: The difference of potential between the segments A A' tends to cause the relative movement of these two parts, and the segment A' swings past the segment A, turning the shaft, and the pointer C crosses the scale, this movement increasing with increase of potential. In order to make the spacing of the subdivisions of the scale more even, the segment A may, if desired, be mounted, as shown in Fig. 3, a little eccentrically to the axis of the shaft X, so that as the pointer moves over the scale the segment A' approaches the segment A, and the torque increases with the potential, and thus compensates for the increased tension of the spring Z caused by the rotation. In the views so far described I have shown the parts of the instrument mounted upon the separate supports S S'. This is the best arrangement, because it prevents all "creeping" of discharges, and the discharge, if it pass at all, must pass through the vacuous space. In certain forms of the instrument, however, designed to measure potentials, which would subject it to less stress, it is possible to vary from this arrangement, and a modified form is therefore shown in Figs. 5 and 6. In these figures the entire instrument is mounted upon a separate stem L, which may then be sealed into the bulb B, the bulb being afterward exhausted in the usual way. For convenience the bulb may be mounted upon a foot F, which is preferably also of glass, so that the instrument may be as nearly as possible absolutely insulated. For further protection it may be inclosed in any suitable case, preferably of insulating material; but as this forms no essential feature of the invention I have not illustrated it.

If desired, the terminals may, as shown in dotted lines at $T^2$ $T^3$, be bent down and inclosed in vessels of oil, so as to prevent accidental discharge from one to the other.

In the particular form of instrument shown in Figs. 5 and 6 I have used the so-called "quadrant" form, in which sectors $S^2$ $S^3$ in different planes are used as the active surfaces; but of course it is immaterial what particular type of instrument is used, the essential feature of the invention consisting in the protection of the instrument of whatever form by a vacuum sufficiently high to prevent "striking" with the particular potential difference to which the instrument is to be subjected.

What I claim as new, and desire to secure by Letters Patent of the United States, is—

1. The improvement in the art of making electric measurements, which consists in inclosing the instrument by which the measurements are effected in a practically non-striking vacuum.

2. The combination of an electric measuring instrument and an exhausted inclosure surrounding the portions between which a high potential difference exists.

3. The combination of an electrostatic measuring instrument and a glass case therefor, within which a high vacuum is maintained, as set forth.

4. The combination of an electrostatic measuring instrument, a glass case surrounding the instrument within which a high vacuum is maintained, and a scale on the case over which the pointer of the instrument moves.

5. An electrostatic high-potential measuring instrument having between the operative parts which control its movements a practically non-striking gaseous medium whereby currents of extraordinary potentials may be safely measured.

6. An electrostatic measuring instrument for high potentials, having between the operative parts which control its movements a high non-striking vacuum.

7. The method of securing greater attractive effort in an electrostatic measuring instrument, which consists in increasing the induction due to the approach of the pieces and, at the same time, of preventing sparking or a discharge from the parts so approximated, by a high vacuum between them.

8. In an electric measuring instrument, the combination with damping means of two relatively movable elements mounted within a vacuum-chamber, with means for furnishing a restoring torque or force, and means for indicating the movement.

In witness whereof I have hereunto set my hand this 15th day of April, 1898.

ELIHU THOMSON.

Witnesses:
DUGALD MCKILLOP,
HENRY O. WESTENDARP.